US006757571B1

(12) United States Patent
Toyama

(10) Patent No.: US 6,757,571 B1
(45) Date of Patent: Jun. 29, 2004

(54) SYSTEM AND PROCESS FOR BOOTSTRAP INITIALIZATION OF VISION-BASED TRACKING SYSTEMS

(75) Inventor: Kentaro Toyama, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 532 days.

(21) Appl. No.: 09/593,628

(22) Filed: Jun. 13, 2000

(51) Int. Cl.[7] .............................................. G05B 13/02
(52) U.S. Cl. ........................... 700/47; 700/28; 700/29; 700/30; 700/31; 382/103; 382/104; 382/105; 706/15; 706/16; 706/20
(58) Field of Search ............................ 700/28, 29, 30, 700/31; 382/103, 104, 105; 706/15, 16, 20, 23, 24; 342/64; 89/1–11; 367/131

(56) References Cited

U.S. PATENT DOCUMENTS

| | | | | | |
|---|---|---|---|---|---|
| 5,572,733 | A | * | 11/1996 | Ryu et al. .................... | 717/104 |
| 5,675,801 | A | * | 10/1997 | Lindsey ....................... | 717/108 |
| 5,987,242 | A | * | 11/1999 | Bentley et al. ............... | 703/13 |
| 6,208,758 | B1 | * | 3/2001 | Ono et al. ................... | 382/190 |
| 6,321,358 | B1 | * | 11/2001 | Anderson .................... | 714/763 |
| 6,378,003 | B1 | * | 4/2002 | Danforth ..................... | 709/316 |
| 6,476,803 | B1 | * | 11/2002 | Zhang et al. ................ | 345/419 |
| 6,499,025 | B1 | * | 12/2002 | Horvitz et al. ............... | 706/52 |
| 6,502,082 | B1 | * | 12/2002 | Toyama et al. .............. | 706/16 |

OTHER PUBLICATIONS

A. Azarbayejani and A. Pentland. Recursive estimation of motion, structure, and focal length. *IEEE Trans. Patt. Anal. and Mach. Intel.*, 17(6), Jun. 1995.

S. Birchfield. Elliptical head tracking using intensity gradients and color histograms. In *Proc. Computer Vision and Patt. Recog.*, pp. 232–237, 1998.

A. Chiuso and S. Soatto. 3–D motion and structure causally integrated over time: Theory (stability) and practice (occlusions). *Technical Report 99–003, ESSRL*, 1999.

J. W. Davis and A. F. Bobick. The representation and recognition of action using temporal templates. In CVPR97, pp. 928–934, 1997.

(List continued on next page.)

*Primary Examiner*—Ramesh Patel
(74) *Attorney, Agent, or Firm*—Lyon & Harr, LLP; Mark A. Watson

(57) ABSTRACT

The present invention is embodied in a system and process for automatically learning a reliable tracking system. The tracking system is learned by using information produced by an initial object model in combination with an initial tracking function, and a data acquisition function for gathering observations about each image. The initial tracking function probabilistically determines the configuration of one or more target objects in a temporal sequence of images. The observations gathered by the data acquisition function include information that is relevant to parameters desired for a final object model. These relevant observations may include information such as the color, shape, or size of a tracked object, and depend on the parameters necessary to support the final tracking function. A learning function based on a learning method such as, for example, neural networks, Bayesian belief networks (BBN), discrimination functions, decision trees, expectation-maximization on mixtures of Guassians, probability distribution functions (PDF), estimation through moment computation, PDF estimation through histograms, etc., then uses the observations and probabilistic target location information to probabilistically learn an object model automatically tailored to specific target objects. The learned object model is then used in combination with the final tracking function to probabilistically locate and track specific target objects in one or more sequential images.

32 Claims, 3 Drawing Sheets

OTHER PUBLICATIONS

D. DeCarlo and D. Metaxas. The integration of optical flow and deformable models with applications to human face shape and motion estimation. In Proc. *Computer Vision and Patt. Recog.*, pp. 231–238, 1996.

P. Fua and C. Miccio. From regular images to animated heads: a least squares approach. In *Proc. European Conf. on Computer Vision*, pp. 188–202, 1998.

M. Isard and A. Blake. ICondensation: Unifying low–level and high–level tracking in a stochastic framework. In *Proc. European Conf. on Computer Vision*, pp. I:893–908, 1998.

T. S. Jebara and A. Pentland. Parametrized structure from motion for 3D adaptive feedback tracking of faces. In *Proc. Computer Vision and Patt. Recog.*, 1997.

J. MacCormick and A. Blake. A probabilistic exclusion principle for tracking multiple objects. In *Proc. Int'l Conf. on Computer Vision*, pp. I:572–578, 1999.

N. Oliver, A. Pentland, and F. Berard. LAFTER: Lips and face real time tracker. In *Proc. Computer Vision and Patt. Recog.*, 1997.

Y. Raja, S. J. McKenna, and S. Gong. Tracking and segmenting people in varying lighting conditions using colour. In *Proc. Int'l Conf. on Autom. Face and Gesture Recog.*, pp. 228–233, 1998.

D. Reynard, A. Wildenberg, A. Blake, and J. Marchant. Learning dynamics of complex motions from image sequences. In *Proc. European Conf. on Computer Vision*, pp. 357–368, 1996.

A. Schoedl, A. Haro, and I. A. Essa. Head tracking using a textured polygonal model. In *Proc. Wkshp. on Perceptual UI*, pp. 43–48, 1998.

R. Stiefelhagen, J. Yang, and A. Waibel. Tracking eyes and monitoring eye gaze. In *Proc. Wkshp. on Perceptual UI*, Banff, Canada, 1997.

H. Tao and T. S. Huang. Bezier volume deformation model for facial animation and video tracking. In *Proc. IFIP Workshop on Modeling and Motion Capture Techniques for Virtual Environments (CAPTECH'98)*, Nov. 1998.

K. Toyama. 'Look Ma, no hands!' Hands–free cursor control with real–time 3D face tracking. In *Workshop on Perceptual User Interfaces*, 1998.

T. Vetter, M. J. Jones, and T. Poggio. A bootstrapping algorithm for learning linear models of object classes. In *Proc. Computer Vision and Patt. Recog.*, pp. 40–46, 1997.

Y. Wu, K. Toyama, and T. S. Huang. Wide–range, person– and illumination–insensitive head orientation estimation. In *Proc. Int'l Conf. on Autom. Face and Gesture Recog.*, 2000.

* cited by examiner

SYSTEM AND PROCESS FOR BOOTSTRAP INITIALIZATION OF VISION-BASED TRACKING SYSTEMS

BACKGROUND

1. Technical Field

The invention is related to a system and process for automatically generating a reliable vision-based tracking system, and more particularly, to a system and process for using information gathered from an initial object tracking system to automatically learn an object model tailored to at least one specific target object to create a tracking system more reliable than the initial object tracking system.

2. Related Art

Most current systems for determining the presence of objects of interest in an image of a scene have involved processing a temporal sequence of color or grayscale images of a scene using a tracking system. Objects are typically recognized, located and/or tracked in these systems using, for example, color-based, edge-based, shape-based, or motion-based tracking schemes to process the images.

While the aforementioned tracking systems are useful, they do have limitations. For example, such object tracking systems typically use a generic object model having parameters that roughly represent an object for which tracking is desired in combination with a tracking function such as, for example, a color-based, edge-based, shape-based; or motion-based tracking function. In general, such object tracking systems use the generic object model and tracking function to probabilistically locate and track at least one object in one or more sequential images.

As the fidelity of the generic object model increases, the accuracy of the tracking function also typically increases. However, it is not generally possible to create a single high fidelity object model that ideally represents each of the many potential derivatives or views of a single object type, such as the faces of different individuals having different skin coloration, facial structure, hair type and style, etc., under any of a number of lighting conditions. Consequently, such tracking systems are prone to error, especially where the actual parameters defining the target object deviate in one or more ways from the parameters defining the generic object model.

However, in an attempt to address this issue, some work has been done to improve existing object models. For example, in some facial pose tracking work, 3D points on the face are adaptively estimated or learned using Extended Kalman Filters (EKF) [1,6]. In such systems, care must be taken to manually structure the EKF correctly [3], but doing so ensures that as the geometry of the target face is better learned, tracking improves as well.

Other work has focused on learning the textural qualities of target objects for use in tracking those objects. In the domain of facial imagery, there is work in which skin color has been modeled as a parametrized mixture of n Gaussians in some color space [7, 8]. Such work has covered both batch [7] and adaptive [8] learning with much success. These systems typically use an expectation-maximization learning algorithm for learning the parameters, such as skin color, associated with specific target objects.

Although color distributions are a gross quality of object texture, learning localized textures of target objects is also of interest. Consequently, other work has focused on intricate facial geometry and texture, using an array of algorithms to recover fine detail [4] of the textures of a target object. These textures are then used in subsequent tracking of the target object.

Finally, work has been done in learning the dynamic geometry, i.e. the changing configuration (pose or articulation), of a target. The most elementary of such systems use one of the many variations of the Kalman Filter, which "learns" a target's geometric state [2]. In these cases, the value of the learned model is fleeting since few targets ever maintain constant dynamic geometries. Other related systems focus on models of motion. Such systems include learning of multi-state motion models of targets that exhibit a few discrete patterns of motion [5, 9].

However, the aforementioned systems typically require manual intervention in learning or fine-tuning those tracking systems. Consequently, it is difficult or impossible for such systems to quickly respond to the dynamic environment often associated with tracking moving target objects under possibly changing lighting conditions. Therefore, in contrast to the aforementioned systems, what is needed is a system and process for automatically learning a reliable tracking system during tracking without the need for manual intervention and training of the automatically learned tracking system. The system and process according to the present invention resolves the deficiencies of current locating and tracking systems by automatically learning, during tracking, a more reliable tracking system tailored to specific target objects under automatically observed conditions.

It is noted that in the preceding paragraphs, the description refers to various individual publications identified by a numeric designator contained within a pair of brackets. For example, such a reference may be identified by reciting, "reference [1]" or simply "[1]". Multiple references are identified by a pair of brackets containing more than one designator, for example, [5, 6, 7]. A listing of the publications corresponding to each designator can be found at the end of the Detailed Description section.

SUMMARY

The present invention involves a new system and process for automatically learning an object model for use in a vision-based tracking system. To address the issue of model fidelity with respect to specific target objects, the learned object model is automatically tailored to represent one or more specific target objects, such as, for example, specific aircraft, cars, people, animals, faces, or any other object in a temporal sequence of at least one image. Learning of the object model is accomplished by automatically determining probabilistic relationships between target state estimates produced by an initial generic tracking system and observations gathered from each image. The learned object model is then employed with a final tracking function to produce an improved tracking system more accurate than the initial generic tracking system.

In general, the system and method of the present invention automatically generates a reliable tracking system by using an initial object model in combination with an initial tracking function to process a temporal sequence of images, and a data acquisition function for gathering observations about each image. Further, in one embodiment, these observations are associated with a measure of confidence that represents the belief that the observation is valid. This measure of confidence may be used to weight the observations. Observations gathered by the data acquisition function are relevant to parameters or variables desired for a learned or final object model. These relevant observations may include information such as the color, shape, texture, size, or any other visual or geometric characteristics of a tracked object, and depend on the parameters necessary to support a known final tracking function. These relevant observations are used by a learning function in combination with the output of the initial tracking function for automatically learning an object model automatically tailored to a specific target object.

The final tracking function may be the same as the initial tracking function, or may be entirely different. For example, both the initial and final tracking function may use edge detection methods to locate target objects in an image. Alternately, the initial tracking function may use color-based detection methods while the final tracking function may use shape-based detection methods to locate target objects in an image. Thus, any type or combination of tracking methods may be used for the initial and final tracking functions.

Data output from the initial tracking function, in combination with the observations generated by the data acquisition function, are fed to the learning function. The learning function then processes the data and observations using a conventional learning method to learn a final object model. Such learning methods include, for example, neural networks, Bayesian belief networks (BBN), discrimination functions, decision trees, expectation-maximization on mixtures of Guassians, probability distribution functions (PDF), estimation through moment computation, PDF estimation through histograms, etc. Once the final object model is learned, the parameters defining this final object model are provided to the final tracking function which processes a temporal sequence of one or more images to accurately locate and track one or more target objects in each image.

The system and method of the present invention operates in two generic cases. First, the invention may be used to improve the tracking accuracy of a tracking system comprising an initial object model, and identical initial and final tracking functions, by automatically tailoring a final object model for use with the final tracking function to better represent one or more specific target objects in a sequence of at least one image. Second, the invention may be used to improve the accuracy-of a tracking system comprising an initial object model, and different initial and final tracking functions by automatically tailoring a final object model for use with the final tracking function to better represent one or more specific target objects in a sequence of at least one image.

Specifically, the system and method of the present invention includes an initial tracking function that accepts the parameters defining the initial model, in combination with one or more sequential images, and outputs a state estimate for each image. This state estimate is a probability distribution over the entire range of configurations that the target object may undergo, wherein higher probabilities denote a greater likelihood of the particular target object configuration. The target configuration typically contains not only position and orientation information about the target object, but also other parameters relevant to the geometrical configuration of the target object such as, for example, geometric descriptions of the articulation or deformation of nonrigid target objects. Multiple targets may be handled by assigning a separate tracking system to each target (where, for example, each tracking system may focus on a single local peak in the probability distribution), or by allowing separate tracking functions to generate a different probability distribution per image, based on distinct characteristics of each of the targets. In the case where multiple target objects are identified, individual object models are created or refined for each target object by individually processing each target object as described below for the case of a single target object. Alternatively, a single model representing all identified target objects may be created or refined, again, as described below for the case of a single target object.

The data acquisition function collects observations or data from each image that will be useful in developing the final object model. This data acquisition function is specifically designed to collect observations relevant to the parameters required by the tracking function with which the learned object model will be used. Typically, the data acquisition function collects observations from the image over the entire configuration space of the target. However, in alternate embodiments, the region of configuration space over which observations are gathered is limited. Limiting the size of this region tends to reduce processing time. Thus, in one embodiment, the state estimate generated by the initial tracking function is used by the data acquisition function such that observations will be made regarding only those portions of the configuration space having a predefined minimum threshold probability of target object identification. In another embodiment, observations from the data acquisition function are collected in only those regions of the target configuration space which are likely to be occupied by the target based on methods such as, for example, dynamic target prediction. In each embodiment, the observations are then provided to the learning function.

In one example, the initial and final tracking functions use an identical head-pose tracking method. Thus, the data acquisition function may be designed to return observations such as, for example, eye, nose and mouth texture qualities with respect to an initial elliptical head model. In a second example, the initial tracking function is based on tracking of heads using a tracking function for detecting head shaped ellipses, and the final tracking function is based on tracking of heads based on detection of skin color. In this second example, the data acquisition function may be designed to return observations of color in particular regions of head shaped ellipses located by the initial tracking function.

As discussed previously, the learning function uses one of the aforementioned learning methods to automatically learn and output a final object model using a combination of the state estimates generated by the initial tracking function and the observations generated by the data acquisition function. Further, in one embodiment, the learning function also employs a partial or complete preliminary object model as a baseline to assist the learning function in better learning a probabilistically optimal object model. The preliminary object model is a tentative object model comprised of generic parameters designed to roughly represent an expected target object. The preliminary object model may be a complete or a partial model, or may initially be blank. One example of a partial object model, with respect to head tracking, is the back of the head, which is typically a relatively featureless elliptical shape having a relatively uniform color. The learning function combines this partial model with information learned about the sides and front of the head, based on data input to the learning function from the initial tracking function and the data acquisition function, to learn the final object model. However, while the use of the preliminary object model may allow the learning function to more quickly or more accurately learn a final object model, the use of a preliminary object model is not required for automatically learning an accurate object model.

In general, the learning function uses automated methods for identifying variable probabilistic dependencies between the state estimates, observations, and preliminary object model, if used, to discover new structures for a probabilistic model that is more ideal in that it better explains the data input to the learning function. Consequently, the learning function is able to learn the probabilistic model best fitting all available data. This probabilistic model is then used by the learning function to output the final object model. The variable probabilistic dependencies identified by the learning function tend to become more accurate as more information is provided to the learning function.

The initial tracking function and the data acquisition function preferably process a predetermined number of images before the learning function outputs the final object model. The number of images that must be processed before the learning function outputs a final object model is dependent upon the form of the initial tracking function. For example, where a motion-based initial tracking function is used, at least two sequential images will likely need to be processed by the initial tracking function and the data acquisition function before the learning function can output a learned final object model. However, where the initial tracking function uses color or edge-based detection techniques, the learning function can output a learned final object model after a single image has been processed.

The final object model learned by the learning function is comprised of the parameters required by the final tracking function to locate and track a target object in an image. Thus, the primary use for the final object model is to provide parameters to the final tracking function for use in processing one or more sequential images. However, the final object model may also be used in several other ways to improve overall tracking system accuracy.

First, in one embodiment, the learned final object model may be iteratively fed back into the learning function in place of the generic preliminary object model described above. This effectively provides a positive feedback for weighting parameters likely to be associated with either the target object or background within each image. Similarly, in the aforementioned embodiment where the preliminary object model is not used, the learned object model may also be iteratively provided to the learning function. Essentially, in either case, this iterative feedback process allows the learned object model to be iteratively provided to the learning function as soon as that object model is learned. The learning function then continues to learn and output a learned object model which evolves over time as more information is provided to the learning function. Consequently, over time, iterative feedback of the learned object model into the learning function serves to allow the learning function to learn an increasingly accurate final object model.

Second, in an embodiment where the initial and final tracking functions are identical, the final object model output by the learning function may be used to iteratively replace the initial object model. In this manner, the accuracy of the state estimate generated by the initial tracking function is improved. Consequently, this more accurate state estimate, in combination with the observations-generated by the data acquisition function, again allows the learning function to learn an increasingly accurate final object model.

Third, in still another embodiment, the two embodiments described above may be combined, where the initial and final tracking functions are identical, to iteratively replace both the initial object model and the generic preliminary object model with the final object model output by the learning function. In this manner, both the accuracy of the state estimate generated by the initial tracking function and the accuracy of the learning function are improved. Consequently, the more accurate state estimate, in combination with the more accurate learning function, again allows the learning function to learn an increasingly accurate final object model.

Fourth, in a further embodiment, where the initial and final tracking functions are different, the final object model may be used to iteratively replace the initial object model, while the final tracking function is used to replace the initial tracking function. In this manner, both the accuracy of the state estimate generated by the initial tracking function and the accuracy of the learning function are improved. Consequently, the more accurate state estimate, in combination with the more accurate learning function again allows the learning function to learn an increasingly accurate final object model.

The final tracking function accepts the parameters defining the final object model, in combination with one or more sequential images and outputs either a final state estimate for each image, or simply target object configuration information with respect to each image. As with the state estimate output by the initial tracking function, this final state estimate is a probability distribution over the entire configuration range of the target wherein higher probabilities denote a greater likelihood of target object configuration. As discussed above, the final object model may be iteratively updated, thereby increasing in accuracy. Consequently, the accuracy of the state estimate or position information output by the final tracking function increases over time as the accuracy of the final object model increases.

In a further embodiment of the present invention, the process described above for learning the final object model may be generalized to include learning of any number of subsequent or "final" object models. For example, the final object model and tracking function described above may be used as an initial starting point in combination with a subsequent data acquisition function and a subsequent learning function to learn a subsequent object model. Clearly, this process may be repeated for as many levels as desired to generate a sequence of increasingly accurate tracking systems based on increasingly accurate learned object models.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Exemplary Operating Environment

Figure 1:
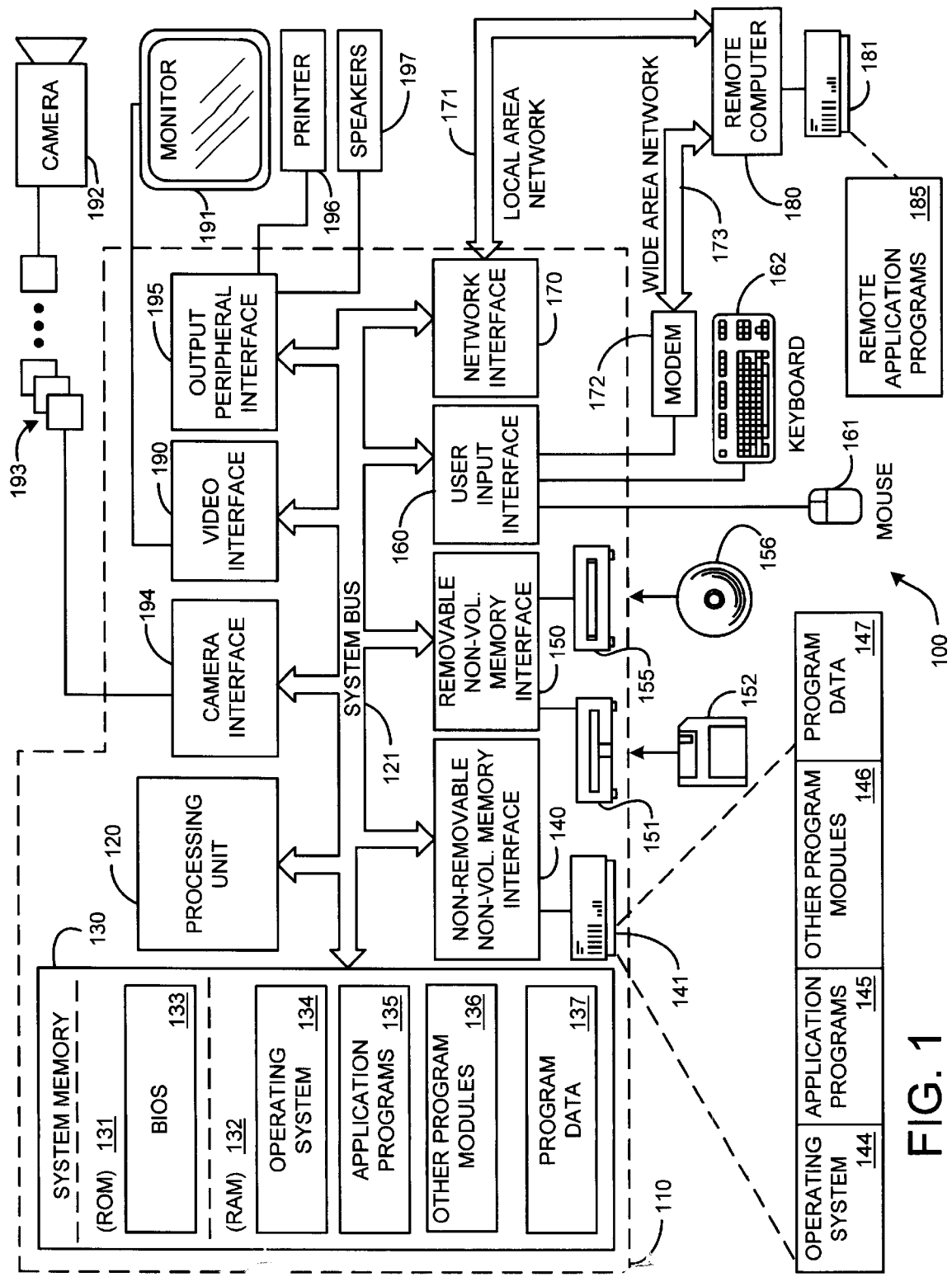
FIG. 1 is a diagram depicting a general-purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general purpose computing device in the form of a computer 110.

Components of the computer 110 may include, but are not limited to, a processing unit 120, a system memory 130, and a system bus 121 that couples various system components including the system memory to the processing unit. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor 191, the computer 110 may also include other peripheral output devices such as printer 196 and speakers 197, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device 181. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and process embodying the present invention. The program modules associated with automatically learning and generating a reliable tracking system will be described first in reference to the system diagram of FIG. 2. Then, the processes for automatically learning and generating a reliable tracking system will be described with reference to the flow diagram of FIG. 3.

System Overview

Figure 2:
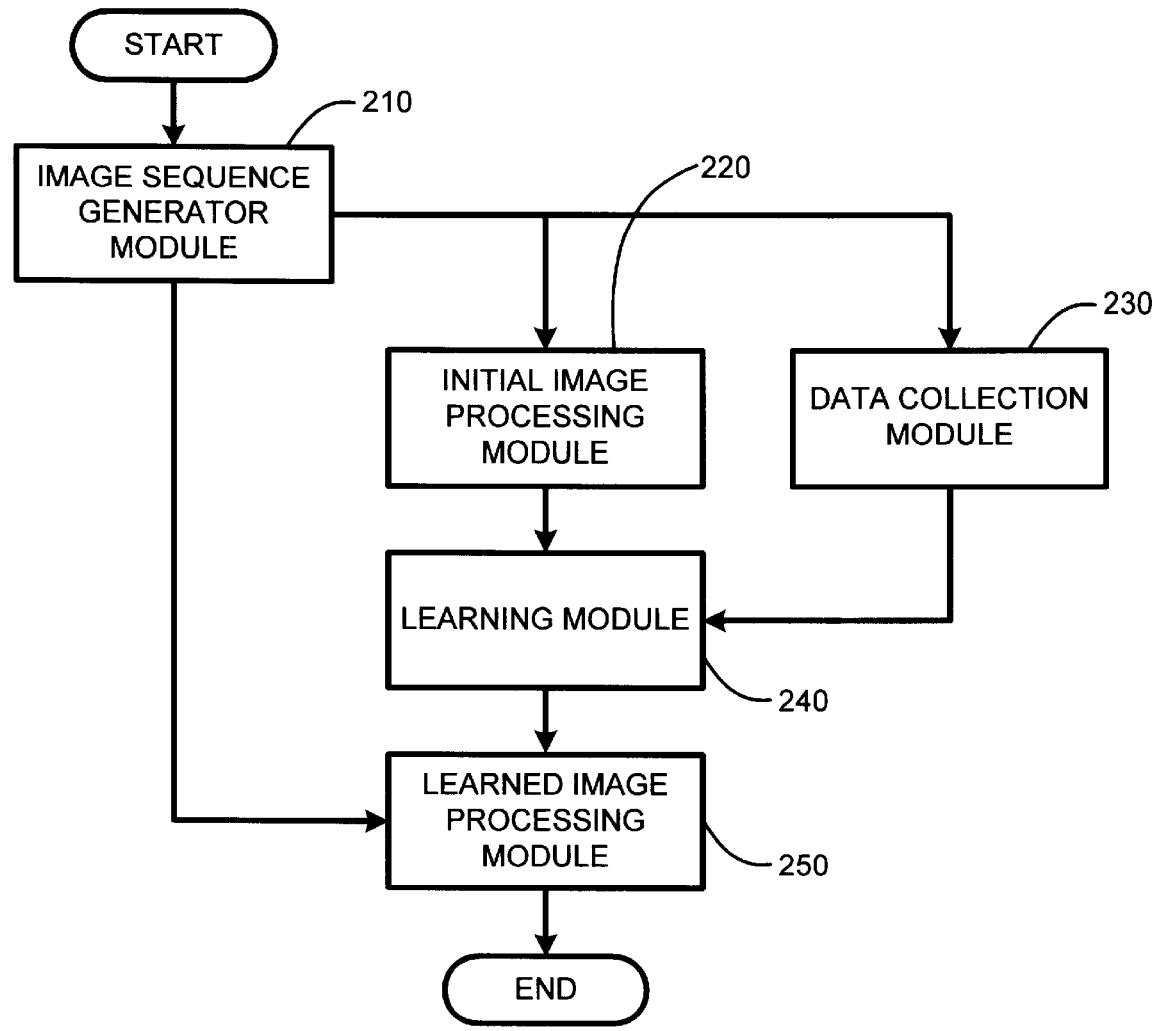
FIG. 2 is a system diagram depicting program modules employed for learning a reliable tracking system in accordance with the present invention.

FIG. 2 is a general system diagram illustrating program modules used for learning a tracking system in accordance with the present system and process. In general, the system and process according to the present invention uses the program modules illustrated in FIG. 2 to automatically learn new object models tailored to one or more specific target objects, such as, for example, specific aircraft, cars, people, animals faces, or any other tangible or visible object during tracking operations. Alternatively, the system and process of the present invention automatically refines an existing object model to better represent one or more specific target objects during tracking operations. These tailored object models are then used in combination with a final tracking function to locate and track objects through one or more sequential images.

Specifically, as illustrated in FIG. 2, the process is started by using a sequential image generator module 210 to automatically provide one or more sequential images of a scene within which tracking is desired to an initial image-processing module 220 and a data collection module 230. These sequential images may be either two dimensional or three-dimensional images, and are preferably captured using conventional methods, such as, for example one or more still or video cameras. The sequential image generator module 210 preferably provides these sequential images as a live input via a conventional image capture device connected to a computing device for implementing the present invention. However, the sequential image generator module 210 may also provide sequential images that have been previously recorded and stored on computer readable media using conventional methods. These stored sequential images may then be processed at any convenient time in the same manner for as live images. Further, because the sequential image generator module 210 provides images on an ongoing basis, for as long as tracking is desired, the program modules described herein continue to generate updated outputs, as described below, for as long as additional images are processed.

Whether the images are live, or stored on computer readable media, the initial image-processing module 220 processes each sequential image and returns a state estimate over each image. This state estimate represents a probabilistic distribution of target object configurations within each image. The data collection module 230 processes the same images as the initial image-processing module 220, and returns observations regarding each image that are used by a learning module 240 in learning a final tracking system for use in a learned image-processing module 250.

The learning module 240 uses conventional learning methods to learn an object model. For example, neural networks, Bayesian belief networks (BBN), discrimination functions, decision trees, expectation-maximization on mixtures of Guassians, probability distribution functions (PDF), estimation through moment computation, or PDF estimation through histograms, etc., could be employed as learning methods in the learning module 240.

The learning module 240 essentially determines the probabilistic relationships between the observations returned by the data collection module 230 and the state estimates returned by the initial image-processing module 220. Next, the learning module 240 employs these probabilistic relationships to automatically learn an object model for use in the final tracking system. The learned image-processing module 250 is then used to process one or more sequential images to return a state estimate over each image. Again, the state estimate represents probabilistic target object configurations within each image.

Initial Image-processing:

The initial image-processing module 220 uses one of any number of conventional tracking systems to probabilistically locate or track one or more target objects in an image or scene. Such tracking systems are typically comprised of a generic object model, having parameters that roughly represent an object for which tracking is desired, in combination with a tracking function. By way of example, and not limitation, such tracking functions may include color-based, edge-based, shape-based, and motion-based tracking functions. In general, these object tracking systems use the generic object model in combination with the tracking function, to probabilistically determine the configuration of at least one object in one or more sequential images.

The target object configuration typically represents not only the position of the target object, but the orientation and other geometric configuration parameters of the target object such as, for example, geometric descriptions of the articulation or deformation of non-rigid target objects. For example, a tracking function using face position and orientation information may be used to collect data about eye color which might in turn be used to determine face position and orientation. The image pixels that would be examined for data acquisition will depend not only on the (x, y) or (x, y, z) position of the center of the face in a two-dimensional or three-dimensional image, respectively, but also upon the orientation of the face, since a tilt or shake of the head will change where the eyes are in the image, even with no change in the (x, y), or (x, y, z) coordinates of face position, per se. Thus, in this example, the data acquisition function would collect data over the entire range of possible target configurations, that is, for (x, y, rx, ry, rz), or (x, y, z, rx, ry, rz) where rx, ry, and rz represent orientation information representing rotation of the head in the x, y, and z-axes. In another example, a tracking function using position, orientation, and other geometric configuration information relating to a target object may be used to collect data about the contour of a target object such as, for example, an airplane that may or may not have its landing gear deployed, or an automobile that may or may not have its doors, trunk, or hood open. This data may be collected in order to determine geometrical constraints on the possible three-dimensional shape of the target object. In this example, multiple image pixels are examined in order to determine probable contours of the target object.

Further, it is also possible for the space of target configurations to be the same as the range of positions in the image, depending upon the specific target object, and the parameters of the tracking function. For example, where the target is a relatively round, smooth, uniformly colored object, orientation or rotation information would not provide any information beyond that provided by position information alone, for the purposes of pixel-based data acquisition.

Specifically, the initial image-processing module 220 includes an initial tracking function that accepts the parameters defining an initial object model, in combination with one or more sequential images provided by the sequential image generator module 210, and outputs a state estimate for each image. This state estimate is a probability distribution over the entire range of configurations of the target object wherein higher probabilities denote a greater likelihood of target object configuration. Multiple targets may be handled by assigning a separate tracking system to each target (where, for example, each tracking may focus on a single local peak in the probability distribution), or by allowing separate tracking functions to generate a different probability distribution per image, based on distinct characteristics of each of the targets. Therefore, in the case where multiple target objects are probabilistically identified by the initial image-processing module 220, individual object models are learned for each target object by individually processing each target object as described herein for the case of a single target object. Alternatively, a single model representing all identified target objects may be created or refined, again, as described herein for the case of a single target object. The state estimate output by the initial image-processing module 220 is provided to the learning module 240 for use in learning an object model tailored to one or more specific target objects as described in detail below. In addition, this state estimate may also be provided to the data collection module 230 for use in refining the observations gathered by the data collection module.

Data Collection:

The data collection module 230 includes a data acquisition function that gathers observations or data about each of the images processed by the initial image-processing module 220. These observations are relevant to parameters desired for the learned object model, and may include information such as, for example, the color, shape, or size of a tracked object. The specific information returned as observations depend on the parameters necessary to support a known final tracking function. In other words, the data collection module 230 is specifically designed to collect observations relevant to the parameters required by the tracking function with which the learned object model will be used. For example, where the final tracking function uses a head-pose tracking method, the data collection module 230 is designed to return observations such as, for example, probable textural characteristics of elements within the image likely to correspond to the eyes, ears, nose and mouth of a tracked head. Further, in one embodiment, these observations are associated with a measure of confidence that represents the belief that the observation is valid. This measure of confidence may then be used to weight the observations. For example, observations having higher relative measures of confidence than other observations are given relatively greater consideration by the learning module 240 in learning an object model.

Typically, the data collection module 230 collects data for the entire space of possible target configurations. This information may include information about specific image pixels, such as, for example, the color, intensity, or position of the pixel, or may include information derived from a plurality of image pixels, such as, for example, the contour, shape, textural qualities, or other geometric parameters representing the configuration of the target object. For example, where the final tracking function is color-based, the data collection module 230 may collect observations of pixel color in an image. Alternately, the data collection module 230 uses the state estimate generated by the initial image-processing module 220 to limit the region of the configuration space over which observations are gathered from an image. Limiting the area over which observations are gathered tends to reduce processing time.

Consequently, in one embodiment, the data collection module 230 uses the state estimate generated by the initial image-processing module 220 such that observations are made regarding only those portions of each image having a predefined minimum threshold probability indicating the probable configuration of a target object. For example, where the initial image-processing module 220 tracks heads using a tracking function for detecting head shaped ellipses, and the final tracking function tracks heads based on detection of skin color, the data collection module 230 is designed to return observations of color in particular regions of head shaped ellipses located by the initial image-processing module 220. In a further embodiment, the data collection module 230 can restrict data collection to only those regions of the target configuration space which are likely to contain the target based on, for example, dynamic prediction of target object configuration. Other methods for limiting the range over which the data collection module 230 operates are also feasible. These methods include, but are not limited to, use of prior probabilities on expected configurations (which will restrict data collection to only those configurations which are deemed more likely to occur in practice), restrictions placed by other sensing modalities (for example, in the case of person/face tracking, audio information generated by a microphone array may be used to restrict the likely places where a person can be), constraints placed by other tracked objects in the scene (if one target occupies a particular configuration, it eliminates the possibility that other targets are in the immediate vicinity of the configuration space), etc. Regardless of which embodiment is implemented, the observations are then provided to the learning module 240.

Learning:

The learning module 240 uses one of the aforementioned learning methods to learn and output a learned object model. In general the learning module learns the object model by determining probabilistic relationships between the state estimates generated by the initial image-processing module 220 and the observations generated by the data collection module 230. The object model learned by the learning module 240 is comprised of the parameters required by the tracking function used in the learned image-processing module 250 to locate and track a target object in an image.

Further, the learning module 240 may also employ a preliminary object model as a probabilistic baseline to assist in learning the learned object model. This preliminary object model is a tentative object model comprised of generic parameters that roughly represent the target object. The preliminary object model may be a complete or a partial model, or may initially be blank. One example of a partial object model, with respect to head tracking, is the back of the head, which is typically a relatively featureless elliptical shape having a relatively uniform color. The learning module 240 combines this partial model with information learned about the sides and front of the head, based on data input to the learning module from the initial image-processing module 220 and the data collection module 230, to automatically generate the learned object model.

As stated previously, the learning module 240 includes a learning function that uses automated methods to identify variable probabilistic dependencies between the state estimates, observations, and preliminary object model, if used, to discover new structures for a probabilistic model that is more ideal in that it better explains the data input to the learning function. Consequently, the learning module 240 uses one or more of the aforementioned methods to "learn" the probabilistic model best fitting all available data. The learning module 240 then uses this probabilistic model to output the learned object model. The variable probabilistic dependencies identified by the learning function, and thus the learned object model, both tend to become more accurate as more information is provided to the learning function. Consequently, the learned object model may be considered to be dynamic, as the learning module 240 can continue to learn and update the learned object model over time as more images are processed.

The initial image-processing module 220 and the data collection module 230 preferably process a predetermined number of images before the learning module 240 outputs the learned object model although model quality is improved with more data from additional images. The minimum number of images that must be processed before the learning module 240 may output a learned object model is dependent upon the form of the tracking function used in the initial image-processing module 220. For example, where a motion-based tracking function is used in the initial image-processing module 220, at least two sequential images will likely need to be processed by the initial image-processing module and the data collection module 230 before the learning module 240 can output a learned object model. However, use of other initial tracking functions may require processing of a different number of images before the learning module has sufficient data to output the learned object model. For example, where the tracking function used in the initial image-processing module 220 uses color or edge-based detection techniques, the learning module 240 can output a learned object model after a single image has been processed.

Learned Image-Processing:

In general, the learned image-processing module 250 accepts the parameters defining the learned object model, in combination with one or more sequential images from the sequential image generator module 210. The learned image-processing module 250 may either reprocess the same temporal sequence of images originally processed by the initial image processing module 220, or alternately, may process sequential images subsequent to those processed by the initial image processing module. In either case, the learned image-processing module 250 outputs either a final state estimate for each image, or simply target object position information with respect to each image.

As with the state estimate output by the initial image-processing module 220, the final state estimate is a probability distribution over the entire range of target configurations wherein higher probabilities denote a greater likelihood of target object configuration. Again, multiple targets may be handled by assigning a separate tracking system to each target (where, for example, each tracking function may focus on a single local peak in the probability distribution), or by allowing separate tracking functions to generate a different probability distribution per image, based on distinct characteristics of each of the targets. As discussed above, the learned object model increases in accuracy as the learning module 240 better learns the conditional probabilistic relationships between the data elements provided to it as described above. Consequently, the accuracy of the state estimate or probabilistic position information output by the learned image-processing module 250 can increase over time as the accuracy of the learned object model increases.

Specifically, as with the initial image-processing module 220, the learned image-processing module 250 uses one of any of number of conventional tracking systems, such as, for example, color-based, edge-based, shape-based, and motion-based tracking functions, to probabilistically locate or track one or more target objects in an image or scene. As with the initial image-processing module 220, the learned image-processing module 250 also includes an object model and a tracking function. However, the primary difference between the initial image-processing module 220 and the learned image-processing module 250 is that while the initial image-processing module uses a generic object model, the learned image-processing module uses the learned object model automatically generated by the learning module 240. As described above, the tracking function in the learned image-processing module 250 may be either identical to, or entirely different from the tracking function used in the initial image-processing module 220.

Operation

The above-described program modules are employed to learn to reliably track objects in one or more sequential images by learning an object model for a tracking system using the process that will now be described. This process is depicted in the flow diagram of FIG. 3 as a series of actions that illustrates an exemplary method for implementing the present invention.

The process is started by providing a temporal sequence of at least one image 310 to the initial tracking function 322. The initial tracking function 322 operates in combination with the initial object model 324, as described above, to probabilistically locate one or more target objects within each image by generating a target state estimate 326. The same sequence of images 310 is also provided to the data acquisition function 332. The data acquisition function 332 then generates observations for each image that are relevant to the parameters used in learning the learned object model 352. The target state estimate 326, and the image observations 334 are then provided to the learning function 340.

Next, the learning function 340 uses any of the aforementioned learning methods to learn probabilistic dependencies between the target state estimate 326 and the image observations 334. Further, in one embodiment, the preliminary object model 342 is also provided to the learning function 340 to allow the learning function to better learn the probabilistic data dependencies between the target state estimate 326 and the image observations 334 as described above. The learning function 340 then uses these probabilistic data dependencies to generate the learned object model 352. This learned object model 352 is then provided to the final tracking function 354 for use in tracking target objects.

Finally, once the learning function 340 has provided the learned object model 352 to the final tracking function 354, the final tracking function begins to process sequential images 310 to provide a target state estimate 356 for each sequential image. As previously discussed, this sequence of images 310 may be either the same images as those already processed by the initial tracking function 322, or they may be subsequent to the images previously processed by the initial tracking function. This final tracking process is continued for as long as it is desired to locate and track targets in images.

Additional Embodiments

Figure 3:
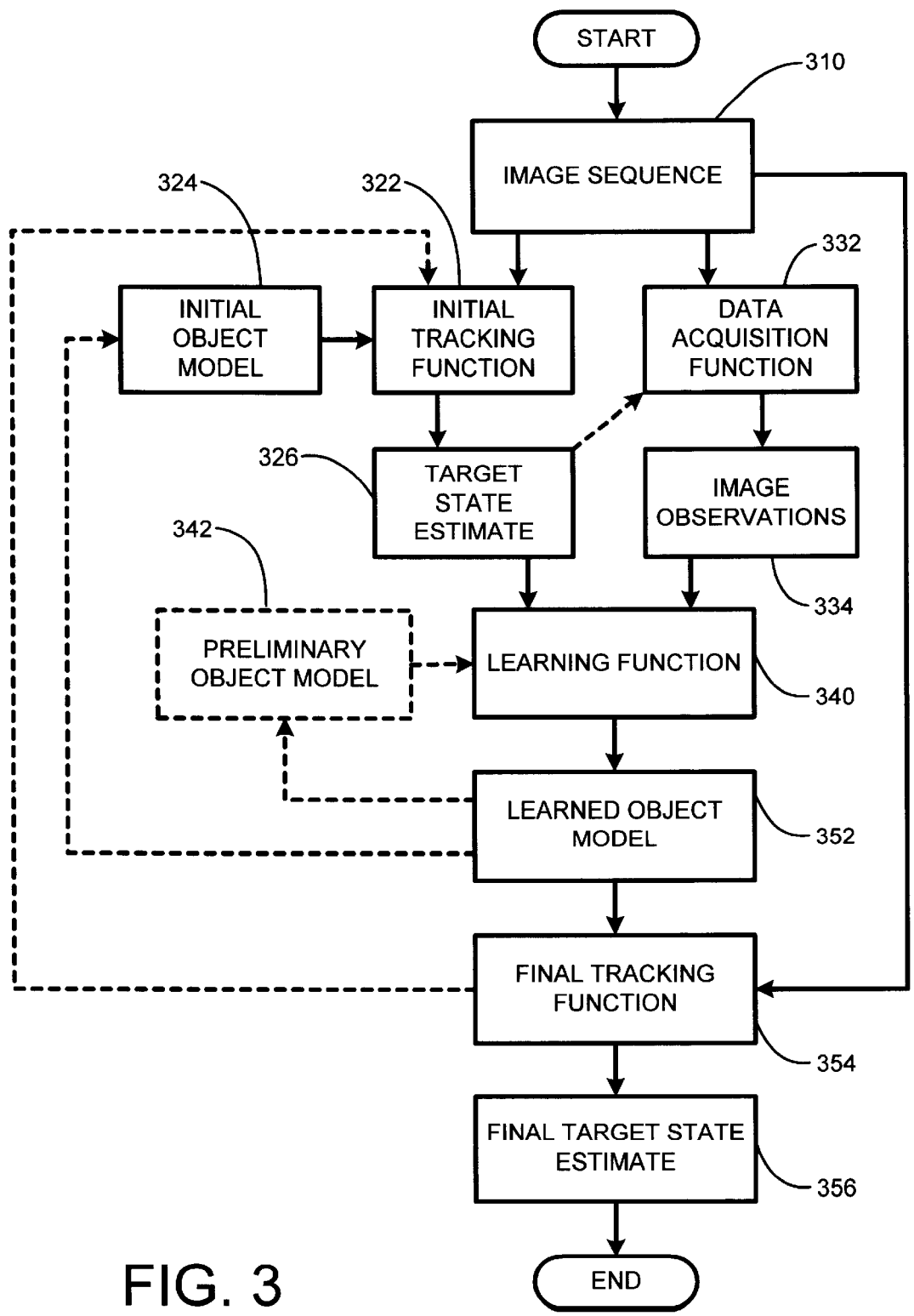
FIG. 3 is a flow diagram illustrating an exemplary process for learning a reliable tracking system according to the present invention.

As described above, the learned object model 352 is comprised of the parameters required by the final tracking function 354. Consequently, the primary use for the learned object model 352 is to provide parameters to the final tracking function 354 for use in processing one or more sequential images. However, the learned object model 352 may also be used in several additional embodiments to improve overall tracking system accuracy. These additional embodiments are illustrated in FIG. 3 using dashed lines.

Specifically, in one embodiment, the learned object model 352 is iteratively fed back into the learning function 340 in place of the preliminary object model 342 described above. Further, the learned object model 352 may also be iteratively fed back into the learning function 340 in the same manner even in the embodiment where the preliminary object model 342 was not provided to the learning function. Essentially, in either case, this iterative feedback process allows the current learned object model to be fed back into the learning function 340 as soon as it is learned. The learning function 340 then continues to learn and output an object model which evolves over time as more information is provided to the learning function. Consequently, use of the final object model, which is inherently more accurate than either the preliminary object model 342 or than no object model at all, serves to improve the accuracy of the learning function. This improvement in accuracy is achieved because the learning function is effectively provided with a better probabilistic baseline from which to learn the learned object model 352, thereby allowing the learning function 340 to learn an increasingly accurate learned object model. This increasingly accurate learned object model 352 in turn allows the final tracking function 354 to generate increasingly accurate target state estimates 356.

In a further embodiment where the initial and final tracking functions 322 and 354 are identical, the learned object model 352 output by the learning function 340 may be used to iteratively replace the initial object model 324. Because the learned object model 352 is inherently more accurate than the initial object model 324, the accuracy of the target state estimate 326 generated by the initial tracking function 322 is improved. Consequently, this more accurate target state estimate 326, in combination with the observations 334 generated by the data acquisition function 332, again allows the learning function 340 to learn an increasingly accurate learned object model 352. Again, this increasingly accurate learned object model 352 in turn allows the final tracking function 354 to generate increasingly accurate target state estimates 356.

In another embodiment, the two embodiments described above may be combined, where the initial and final tracking functions 324 and 354 are identical, to iteratively replace both the initial object model 324 and the preliminary object model 342, whether or not used, with the learned object model 352 output by the learning function 340. In this manner, both the accuracy of the target state estimate 326 generated by the initial tracking function 322 and the accuracy of the learning function 340 are improved. Consequently, the more accurate target state estimate 326, in combination with a more accurate learning function 340, again allows the learning function to learn an increasingly accurate learned object model 352. Again, this increasingly accurate learned object model 352 in turn allows the final tracking function 354 to generate increasingly accurate target state estimates 356.

In addition, in another embodiment, where the initial and final tracking functions 324 and 354 are different, the final object model may be used to iteratively replace the initial object model 324, while the final tracking function 354 is used to replace the initial tracking function 322. In this manner, both the accuracy of the target state estimate 326 generated by the initial tracking function 322 and the accuracy of the learning function 340 are improved. Consequently, the more accurate target state estimate 326, in combination with a more accurate learning function 340, again allows the learning function to learn an increasingly accurate learned object model 352. Again this increasingly accurate learned object model 352 in turn allows the final tracking function 354 to generate increasingly accurate target state estimates 356.

In a further embodiment of the present invention, the process described above for learning the final object model 352 may be generalized to include learning of any number of subsequent learned object models 352. For example, the learned object model 352 and final tracking function 354 described above may be used as an initial starting point in combination with a subsequent data acquisition function and a subsequent learning function to learn a subsequent object model for use with a subsequent tracking function which may be either identical to or distinct from the final tracking function 354. Clearly, this process may be repeated for as many levels as desired to generate a sequence of increasingly accurate tracking systems based on increasingly accurate learned object models.

Working Example

In a working example of the present invention, a face-pose recognition function is used for both the initial tracking function and the final tracking function. Specific details of the face-pose recognition function may be found in the copending patent application entitled GAZE AND HEAD POSE ADJUSTED VIDEO CONFERENCING, filed Mar. 20, 2000, and assigned Ser. No. 09/528,827.

In general, the initial object model is a generic face-pose model having parameters including the rotation of a generic face model in the x, y, and z-axes. While the generic face-pose model may be a reasonable approximation of a face, it is not ideally trained to match the facial features of a particular person.

Consequently, in this example, the initial face-pose recognition function returns state estimates for probabilistic face poses in each image. In addition, the data acquisition function is designed to extract parameters defining feature vectors from each sequential image. These feature vectors define the textural qualities of the facial features, such as, for example, the ears, eyes, nose, and mouth of a target face. The parameters are generated by the data acquisition function by rotating the generic face-pose model through the set of possible orientations in the x, y and z-axes while mapping the feature vectors to the generic face model to determine the most probable orientation of each of the facial features of the target face. The most probable orientation of the facial features are then output by the data acquisition function as observations useful for developing the final object model, which, in this example will be a face-pose model trained for the particular target face or faces in the sequential images.

The learning function then uses the observations of the data acquisition function in combination with the face-pose state estimates generated by the face-pose recognition function to learn the final face-pose model. This is accomplished by using the initial tracking function to determine the probability distribution of face poses for each image. These face-pose orientation parameters are then used by the learning function which collects feature vectors for each point on the model for the most likely pose as given by the initial tracking function, and then uses a single Gaussian distribution to approximate the data distribution for model points tailored to the particular target face or faces identified in the sequential images.

The parameters of the final face-pose model are then input into the final tracking function, which in this example, is the same face-pose recognition function as the initial tracking function, in combination with one or more sequential images. This final tracking function then outputs a final state estimate of the location and orientation of the target face for future incoming images.

As with the alternate embodiments described above, this working example may be modified by providing a preliminary face-pose model to the learning function in combination with the observations of the data acquisition function and the face-pose state estimates generated by the face-pose recognition function. Further, the final face-pose model may also be used to iteratively replace the initial face-pose model in the manner described above.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1]. A. Azarbayejani and A. Pentland. Recursive estimation of motion, structure, and focal length. *IEEE Trans. Patt. Anal. and Mach. Intel.*, 17(6), June 1995.

[2]. S. Birchfield. Elliptical head tracking using intensity gradients and color histograms. In *Proc. Computer Vision and Patt. Recog.*, pages 232–237,1998.

[3]. A. Chiuso and S. Soatto. 3-D motion and structure causally integrated over time: Theory (stability) and practice (occlusions). *Technical Report* 99-003, ESSRL, 1999.

[4]. P. Fua and C. Miccio. From regular images to animated heads: a least squares approach. In Proc. *European Conf. on Computer Vision*, pages 188–202,1998.

[5]. M. Isard and A. Blake. ICondensation: Unifying low-level and high-level tracking in a stochastic framework. In Proc. *European Conf. on Computer Vision*, pages I:893–908,1998.

[6]. T. S. Jebara and A. Pentland. Parametrized structure from motion for 3D adaptive feedback tracking of faces. In *Proc. Computer Vision and Patt. Recog.*, 1997.

[7]. N. Oliver, A. Pentland, and F. Berard. LAFTER: Lips and face real time tracker. In *Proc. Computer Vision and Patt. Recog.*, 1997.

[8]. Y. Raja, S. J. McKenna, and S. Gong. Tracking and segmenting people in varying lighting conditions using colour. In *Proc. Int'l Conf. on Autom. Face and Gesture Recog.*, pages 228–233, 1998.

[9]. D. Reynard, A. Wildenberg, A. Blake, and J. Marchant. Learning dynamics of complex motions from image sequences. In *Proc. European Conf. on Computer Vision*, pages 357–368, 1996.

What is claimed is:

1. A computer-implemented process for generating an object model, comprising:

generating a state estimate defining probabilistic states of at least one target object for each of at least one sequential images;

generating observations for each sequential image; and automatically learning the object model using the state estimates and the observations.

2. The computer-implemented process of claim 1, further comprising using the learned object model in a tracking system for determining the configuration of at least one target object in each sequential image.

3. The computer-implemented process of claim 1 wherein generating the state estimate comprises processing each image using an initial tracking system which further comprises an initial object model and an initial tracking function.

4. The computer-implemented process of claim 3 wherein the initial object model is iteratively replaced with the learned object model to improve the accuracy of the initial tracking system.

5. The computer-implemented process of claim 3 wherein:
a preliminary object model is used in combination with the state estimate and the observations to automatically learn the learned object model; and
the initial object model and the preliminary object model are iteratively replaced with the learned object model to improve the accuracy of the initial tracking system and the accuracy of learning the learned object model.

6. The computer-implemented process of claim 3 wherein the learned object model is used in a final tracking system further comprising a final tracking function for determining the configuration of at least one target object in each sequential image.

7. The computer-implemented process of claim 6 wherein the initial object model is iteratively replaced with the learned object model and the initial tracking function is replaced with the final tracking function to improve the accuracy of the initial tracking system and the accuracy of learning the learned object model.

8. The computer-implemented process of claim 1 wherein generating observations comprises collecting data from each image that is relevant to parameters defining the learned object model.

9. The computer-implemented process of claim 1 wherein automatically learning the object model comprises automatically determining conditional probabilistic dependencies between the state estimate and the observations.

10. The computer-implemented process of claim 1 wherein a preliminary object model is used in combination with the state estimate and the observations to automatically learn the learned object model.

11. The computer-implemented process of claim 10 wherein the preliminary object model is iteratively replaced with the learned object model to improve the accuracy of learning the learned object model.

12. The computer-implemented process of claim 1 wherein generating observations for each sequential image is limited to regions of configuration space wherein the probabilistic state of the object exceeds a minimum threshold value.

13. The computer-implemented process of claim 1 wherein generating a state estimate defining probabilistic states of an object comprises generating a unique state estimate for each target object.

14. The computer implemented process of claim 13 wherein a unique object model is learned for each target object.

15. The computer implemented process of claim 14 further comprising using each learned object model in a tracking system for determining the configuration of each target object in each sequential image.

16. A system for tracking target objects in at least one sequential image, comprising:
a general purpose computing device; and
a computer program comprising program modules executable by the computing device, wherein the computing device is directed by the program modules of the computer program to,
(a) generate an initial probabilistic estimate of target object configurations within each image using an initial tracking system,
(b) generate observations for each image,
(c) automatically learn an object model tailored to the target objects by determining probabilistic interdependencies between the initial probabilistic estimate and the observations, and
(d) generate a final probabilistic estimate of target object configurations within each image using a final tracking function in combination with the learned object model.

17. The system of claim 16 wherein the initial tracking system includes:
an initial object model; and
an initial tracking function.

18. The system of claim 17 wherein the initial object model is iteratively replaced with the learned object model and the initial tracking function is replaced with a final tracking function in the final tracking system to improve the accuracy of the initial tracking system and the accuracy of learning the learned object model.

19. The system of claim 16 wherein generating observations for each image comprises collecting data from each image that is relevant to parameters required by the final tracking function.

20. The system of claim 16 wherein a preliminary object model is used with the initial probabilistic estimate and the observations to provide a probabilistic baseline for use in automatically learning the object model.

21. The system of claim 20 wherein the preliminary object model is iteratively replaced with the learned object model to improve the accuracy of learning the learned object model.

22. The system of claim 20 wherein an initial object model in the initial tracking system and the preliminary object model are iteratively replaced with the learned object model to improve the accuracy of the initial tracking system and the accuracy of learning the learned object model.

23. The system of claim 16 wherein an initial object model in the initial tracking system is iteratively replaced with the learned object model to improve the accuracy of the initial tracking system.

24. The system of claim 16 wherein the probabilistic estimate of target object configurations is used to limit the region in configuration space over which observations are generated.

25. A computer-readable memory for identifying and locating objects of interest in a scene, comprising:
a computer-readable storage medium; and
a computer program comprising program modules stored in the storage medium, wherein the storage medium is so configured by the computer program that it causes the computer to,
generate an initial configuration estimate for objects of interest within the scene,
identify elements within the scene that are relevant to a final object model,
automatically learn the final object model by determining probabilistic relationships between the initial configuration estimates and the identified elements, and,
generate a final configuration estimate for objects of interest in a scene by using the final object model in combination with a final tracking function.

26. The computer-readable memory of claim 25 wherein the program module for generating the initial configuration estimate further includes an initial object model and an initial tracking function, and wherein the initial object model is comprised of parameters used by the initial tracking function for locating and identifying objects within the scene.

27. The computer-readable memory of claim 26 further comprising a program module for iteratively replacing the initial object model with the learned final object model.

28. The computer-implemented process of claim 26 wherein the initial object model is iteratively replaced with the learned final object model and the initial tracking function is replaced with the final tracking function.

29. The computer-readable memory of claim 25 wherein the program module for identifying elements within the scene uses the initial configuration estimates to limit the identification of elements within the scene to those areas of the scene most likely to contain objects of interest.

30. The computer-readable memory of claim 25 wherein the program module for automatically learning the final object model further includes a preliminary object model for establishing a probabilistic baseline to assist in learning the final object model.

31. The computer-readable memory of claim 30 further comprising a program module for iteratively replacing the preliminary object model with the learned final object model.

32. The computer-readable memory of claim 30 wherein the program module for generating the initial configuration estimate further includes an initial object model, and wherein the initial object model and the preliminary object model are iteratively replaced with the learned final object model.

* * * * *